METHOD AND APPARATUS FOR NONDESTRUCTIVE MEMORY DEVICES

Filed April 3, 1963

INVENTOR.
GEORGE H. BARNES
BY Kenneth L. Mills
ATTORNEY

PRIOR ART

INVENTOR.
GEORGE H. BARNES
BY Kenneth L. Miller
ATTORNEY

INVENTOR.
GEORGE H. BARNES
BY Kenneth L. Miller
ATTORNEY

United States Patent Office 3,435,426

Patented Mar. 25, 1969

3,435,426

METHOD AND APPARATUS FOR NONDESTRUCTIVE MEMORY DEVICES

George H. Barnes, West Chester, Pa., assignor to Burroughs Corporation, Detroit, Mich., a corporation of Michigan Filed Apr. 3, 1963, Ser. No. 270,230
Int. Cl. G11c *11/08*
U.S. Cl. 340—174 19 Claims

ABSTRACT OF THE DISCLOSURE

The present disclosure describes a method and apparatus for writing information into magnetic memory elements having nonintersecting multiple apertures, and in which said writing uses only first and second electrical conductors threaded respectively through separate apertures of the memory element in an orthogonal direction. The orthogonal write operation is performed by applying in at least partial coincidence, a single bidirectional pulse doublet and an information pulse to respective ones of said first and second electrical conductors.

This invention relates broadly to magnetic storage devices and more particularly to magnetic storage devices having multiple apertures with windings threaded therethrough in orthogonal relationship.

In the prior art there have been a number of non-destructive interrogation techniques described for utilization with magnetic devices. For example, one such device is described in Chedaker et al. application Ser. No. 248,716, filed Sept. 28, 1951 and now abandoned in favor of a continuation application Ser. No. 596,352, filed June 20, 1966, and assigned to a common assignee, and a further device described in an article by Buck and Frank titled, "Nondestructive Sensing of Magnetic Cores," appearing in Communications and Electronics issue of January 1954, at pages 822–830. Additionally, the 1959 IRE Wescon Conference Record, part IV, at pages 40–54, contains an article by C. L. Wanlass and S. D. Wanlass titled, "Biax High Speed Magnetic Computer Element." The Biax element is said to make use of a principle of flux interference and not flux steering, as is common in most multiaperture devices. One important advantage of such an element is that it may be operated in a nondestructive interrogate mode. Additionally, the orthogonal field relationship permits magnetic core materials which do not have a squareness ratio as exacting as that required in conventional toroidal core systems of the coincident current variety.

Although that element may have certain desirable characteristics when used by itself or in small numbers, there are considerable problems when the units are combined together to form a stack of memory planes capable of storing a reasonable number of bits of information, as is required in the more common systems of modern computers. The IRE article referred to above illustrates one form of memory array and this application in describing prior art techniques also illustrates another approach.

However, the aspect of all of these systems which is most undesirable is the requirement that a number of wires must thread through the store aperture of each of the memory elements in order to arrive at a useable system for storing information in a memory array. In a conventional technique a single plane may be wired independently and then combined together with a number of similar planes thereafter threading straight through wires. However, noise elimination becomes a major problem and particularly when the storage capacity of the memory array is relatively sizeable. In order to minimize some of the objectionable noises so as not to confuse a sensed noise signal with a sensed informational signal, various techniques are tried such as the scheme of threading a wire through a storage aperture of successive memory elements with the alternate threading directions being in the opposite sense so as to minimize noises resulting from inductive coupling. However, this approach has not been completely satisfactory. Furthermore, it has been found that there are noises generated by capacitive coupling as well as by inductive coupling between the various wires threaded through the storage apertures.

One further problem associated with memory arrays of the type described herein is the need for providing a plurality of decoding networks whereas only a single decoding network is required in accordance with one embodiment of the present invention.

The present invention may be applied to two types of multiapertured magnetic devices described by way of example in this specification. A first type of device is the magnetic block of material having two nonintersecting orthogonally oriented apertures, termed storage and interrogate apertures, with appropriate windings threaded through the apertures, such as described in the aforementioned IRE article. A second type of device may be termed a "shirt button" of the variety having four holes through the magnetic material. A winding threaded through two vertical holes may be termed a drive winding, whereas one threaded in orthogonal relationship through two horizontal holes is termed a sense winding. The button may be about 0.1 inch in diameter and so proportioned that the thinnest parts which limit the switching flux are the four legs between the holes. Although the device is illustrated as being circular, it is understood that it could also be square or other shape and additional apertures may be employed. A more detailed description of these devices is hereinafter presented.

Therefore, one object of the present invention is to eliminate noises due to inductive and capacitive coupling between the various wires of a memory array. The elimination of noise enables an improvement in the signal-to-noise ratio and may permit smaller amplitude current pulses which lessens the heating of the individual core elements, or by using the same amplitude current pulses permits greater dependability in the sensing circuits, or permits larger arrays to be built with satisfactory noise behavior and thereby makes storage of large amounts of data more economical.

A second object of the invention is to enable an easy assembly into a memory array of a first type magnetic element having orthogonally directed apertures. This object is accomplished in the present invention by simplifying the writing operation in such elements by the elimination of an additional threaded wire which extends throughout the array of prior art devices.

A further object is to minimize cost and ease of wiring the arrays originally as well as enabling a ready rewiring operation so as to be able to discard defective core elements when they are discovered in a testing operation.

The present invention accomplishes the above improvements over prior art schemes by providing a method and apparatus for writing into elements of the type described in a direct manner. The writing operation may take place by using only a single sense wire threaded through the apertures in one direction as well as a single interrogate wire threaded through the apertures in an orthogonal direction. In an array the wires may now be threaded straight through without any necessity for crossing over the wire pattern from core to core in the array. Additionally, since a second wire through a storage aperture has been eliminated by the present invention, there is one less decoder network required which would otherwise be required for the selection of such wires. An orthogonal write operation may then take place by applying at least one bidirectional pulse doublet to the interrogate wire as well as an information pulse to the sense wire.

These and other objects of the invention become apparent upon an understanding of the more specific description of the invention and the drawings in which.

Figure 6:
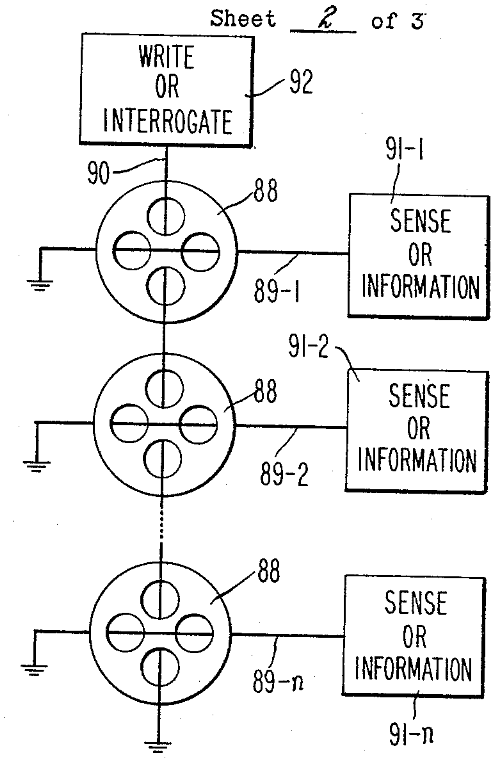
Figure 4:
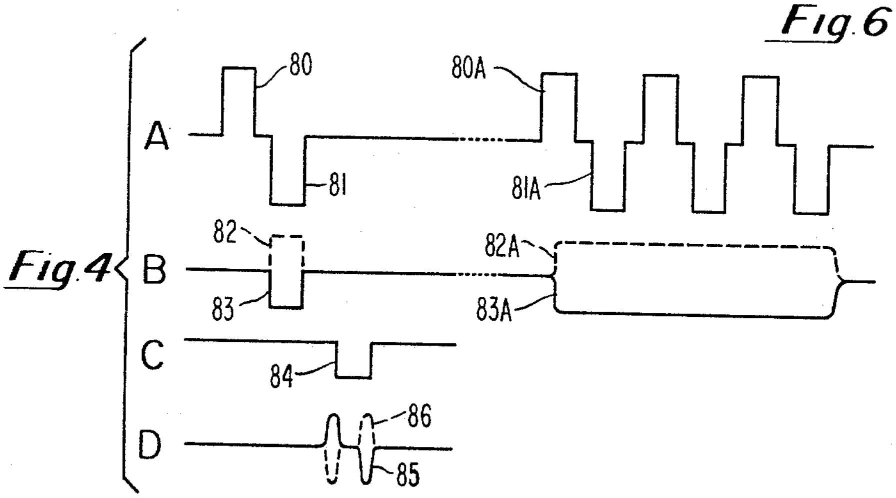
Figure 5:
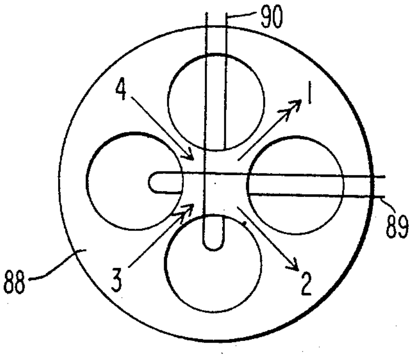

FIG. 4 contains idealized waveforms associated with the system described in connection with FIGS. 3 and 6;

FIG. 5 shows a memory "button" or four hole device with its orthogonally threaded windings; and FIG. 6 shows a single word of four hole devices in accordance with the present invention.

Briefly, the technique of the present invention is described in connection with a word organized memory in which a selected word may have its information read out by the energization of a single interrogate line. The interrogate line threads in an interrogate direction through the apertures of a number of magnetic elements, each of which constitutes a respective bit position of the word. The binary stored information from each of the memory elements is then sensed along sense wires which thread in orthogonal relationship through the remaining apertures of the elements. In this regard the technique of the present invention is essentially the same as that of the prior art. The difference between the systems resides in the method and apparatus associated with a writing operation. In order to write new information into a selected word in accordance with the present invention, a particular current waveform is applied to the interrogate line which also serves as a word write line. Concurrently an informational current waveform is applied to the respective sense lines. The sense lines serve the dual function of sensing and carrying information current for a write operation. If it is desired to write a "one" a first polarity of information current may be applied along the sense line of the arrays, whereas all oppositely poled pulse is applied to write a "zero." During the writing operation the word write line may receive a bidirectional pulse doublet which coacts with the informational bit applied along the respective sense lines, thereby causing the surrounding magnetic material to reside in appropriate magnetic storage states representative of the binary "ones" or "zeros" contained in the word.

Prior to discussing in more detail the system in accordance with the present invention, it is deemed desirable to discuss the operation of the first type element, the basic orthogonally apertured element. The description in the Wanlass and Wanlass publication is complete in describing such a memory element and the subject matter of that article is incorporated by reference into this disclosure. However, a brief description sufficient to enable an understanding of the invention is herein presented. The magnetic element conventionally has a dimension of approximately .05 inch by .05 inch by .08 inch. A storage aperture extends through one dimension of the memory element and it may be a .03 inch diameter round or square hole. Extending orthogonally in nonintersecting fashion is a further interrogation aperture which may be round or square with a .02 inch diameter. For discussion purposes, a binary information bit may be stored by passing a sufficient current through a wire extending through the storage aperture so as to cause the magnetic material surrounding such aperture to saturate in one direction or another. In order to interrogate the storage state of the element, a current may be passed through a wire entering the interrogate aperture which causes the material surrounding that aperture to saturate again in either a first or a second direction. It is normally unnecessary to switch the material around the interrogate aperture during read-out. In the slice or volume of material between the storage and interrogate apertures there is created an orthogonally directed magnetic field upon interrogation which in theory tends to rotate the stored magnetic field causing the flux surrounding the storage aperture to either increase or decrease. The change in flux due to the interrogation generates an information voltage signal in a sense wire threading the storage aperture. The sensed signal is normally a bipolar pulse pattern, the initial pulse direction being determined solely by the stored magnetic flux direction surrounding the storage aperture. In this regard, when using a unidirectional drive, it makes no difference whether the interrogate current pulse causes the material surrounding the interrogate aperture to become saturated in a positive or a negative direction, since in either case the sensed information pattern will be the same. Depending upon the core material used and the amplitude and the wave shape of interrogate current, the sensed output may either be a predominately unidirectional going pulse exceeding a predetermined amplitude, or a bidirectional doublet voltage signal in which the polarity sequence of the doublet voltage pulses dictates whether the memory element stores a binary "one" or a binary "zero" signal.

Figure 1:
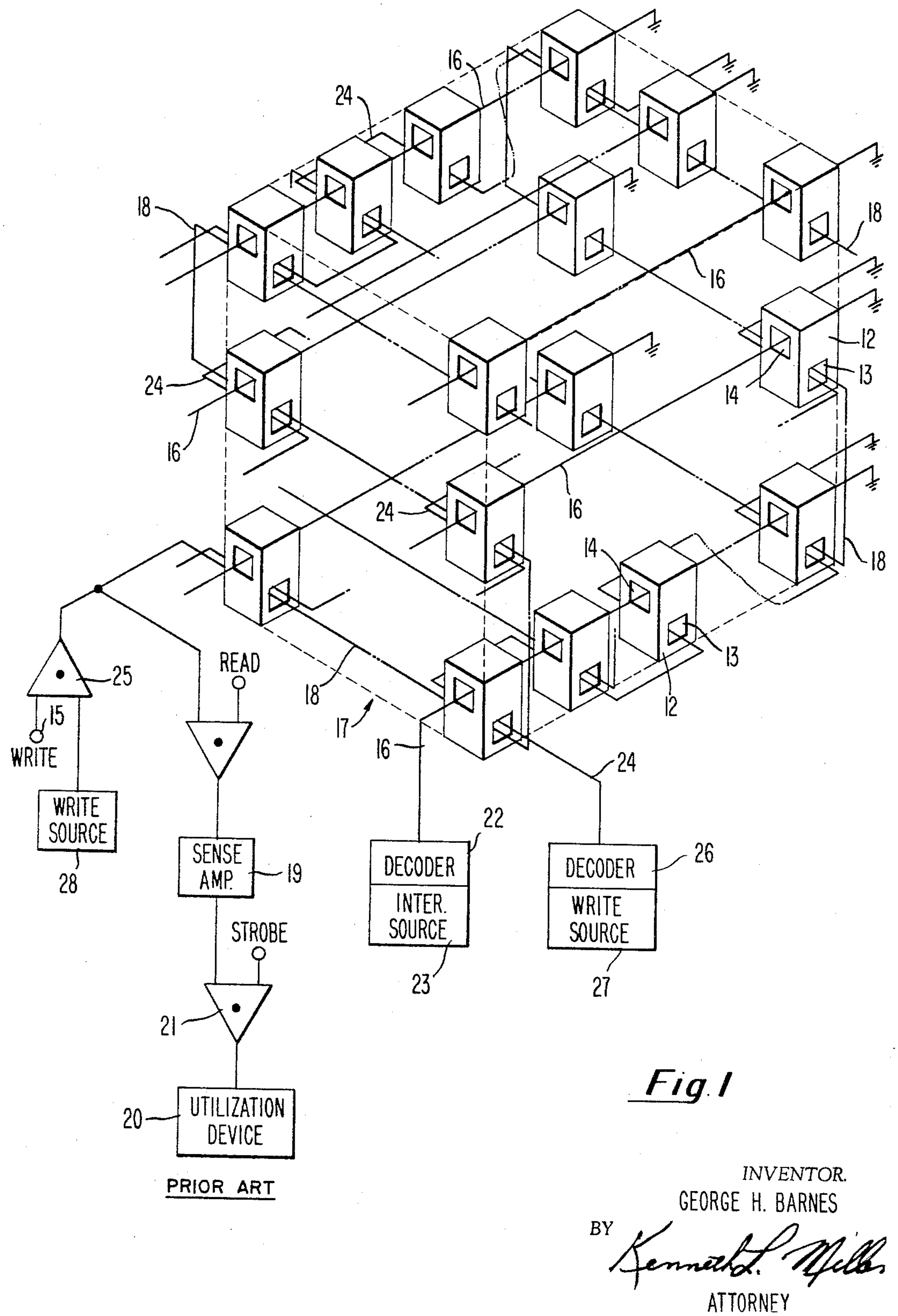
FIG. 1 illustrates a memory array in accordance with the prior art.
Figure 2:
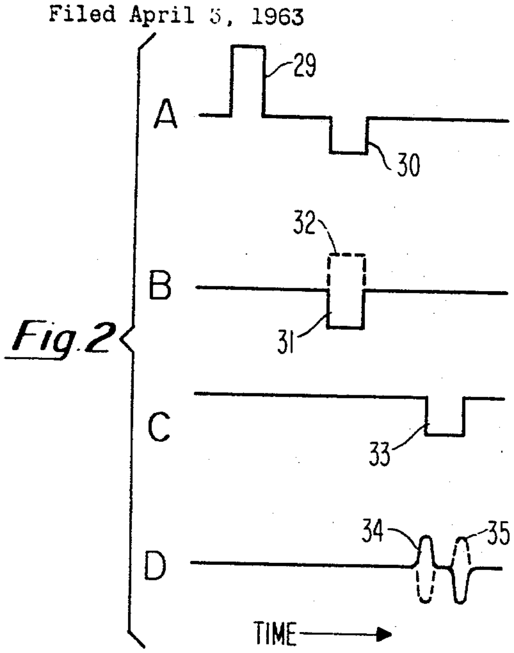
FIG. 2 illustrates idealized waveforms which may be associated with the write and interrogate operation of the prior art FIG. 1 system.

Referring specifically to FIG. 1, a memory array is illustrated in which the memory elements 12 are shown to include a storage aperture 13 and an interrogate aperture 14. Word wire 16 is shown as threading directly through the interrogate apertures of an *"n"* bit word thereby including *"n"* memory elements along each word line. For simplicity and ease of illustration and understanding., only a few of the memory elements in each plane surface have been illustrated, but it is readily understood that the elements may be in contacting relationship permitting an extremely compact module. In the illustrated array, by way of example only, it is contemplated that there may be stored 1024 words with each word containing 36 bits of information. That is, the face 17 could include a matrix of 32 cores on a side, thus providing 1024 individual cores on the face. Each core may be considered as being the first informational bit of the 36 bits which constitute each word. It is understood that this size memory is illustrative in the described memories and is not intended to be otherwise limiting. It will be seen that there are 36 sense wires 18 which make up the 36 bit positions of the words. Each sense wire threads through the storage apertures 13 of 1024 memory elements which make up the bit position of each of the words. There are likewise 36 sense amplifiers 19, one for each of the bit positions, which amplifiers energize a utilization device 20 when the signals are gated through AND gates 21 by an appropriate strobe pulse. The informational signals appear on the respective sense lines as a result of an interrogate current being furnished to a selected word line 16. It is understood that an appropriate decoder network 22 is necessary to select the desired word line 16 from the total of 1024 such word lines. Further, an interrogate source 23 of general form is required to deliver an interrogate pulse along the selected word line 16. The nature of the pulses will be described hereinafter in connection with FIG. 2.

In the prior art device of FIG. 1, a write operation generally requires a further set of word write lines 24 which thread through the respective bit positions of each word in a weaving fashion so as to minimize noise generation. The word write lines 24 thread through storage apertures 13 along with the sense lines 18. When it is desired to write or store a new word, it is necessary to first select the desired word write line 24 through an additional decoder 26 and by providing an appropriate write signal from write source 27. In time coincidence it is also conventional to energize each of the 36 sense lines for a 36-bit word by the respective write sources 28 through an appropriate AND gate 25 and a write timing pulse 30 furnished to terminal 15 of the gate 25. The write sources 28 associated with each of the sense lines have selected polarities of current pulses to store the respective "ones" and "zeros" as desired. These signals will also be discussed in connection with the waveforms of FIG. 2.

One of the desirable aspects of this type storage element is the feature that current amplitudes do not have to be as accurately controlled as they do in the conventional coincident current half select techniques of the more commonly used toroidal magnetic core matrices. During a write operation it is understood that both a selected line 24 as well as the respective sense lines 18 must be energized to record the desired binary bits along the selected word line. As is shown in FIG. 2A, the write current provided to line 24 may first have a positive going pulse 29 which has sufficient amplitude and duration to cause each of the cores located along the selected line to be set to a reference state. This reference state may be considered as a binary "one" and therefore each of the cores along the selected word line has stored in it a binary "one." Thereafter a negative going pulse 30 is provided to the selected word write line 24 which may have insufficient magnitude and duration to reverse the magnetic storage state surrounding the storage apertures of the respective elements. During this time, however, the respective write sources 28 direct current along sense lines 18 in either a negative going direction, as shown by pulse 31, or in a positive going direction, as shown by phantom pulse 32. The coincidence of two current pulses of the same direction passing through the storage apertures 13 are sufficient to reverse the set state of the particular magnetic element 29 so as to store a binary "zero." At those core locations in which pulses 30 and 32 of an opposite going direction appear together, the algebraic sum of the currents is less than a core threshold, so that those cores remain in the "one" reference state in which they were placed by current pulse 29.

It has been found that large size memory arrays have noises generated therein which often times makes difficult the detection of the desired signal as compared to the noise signals. The noises in such large size arrays have been attributed to capacitive and inductive coupling among the multiple wires threading through the arrays in an ineffective cancelling pattern. To better understand an interrogate operation, reference is had to FIG. 2C. A negative going interrogate pulse 33 is applied along selected line 16, which threads through interrogate apertures 14. As has been indicated earlier, the signal appearing along sense lines 18 may be a bipolar voltage signal which is generated due to the change in total flux surrounding storage apertures 13. The bipolar signal is dependent upon the original stored state and not upon the direction of the unidirectional current pulse 33 passing through line 16. FIG. 2D illustrates an idealized waveform 34 depicting the output generated along line 18 when a binary "one" has been stored therein. Phantom pulse 35 illustrates the opposite waveform which is generated along sense line 18 due to the storage of a binary "zero."

Figure 3:
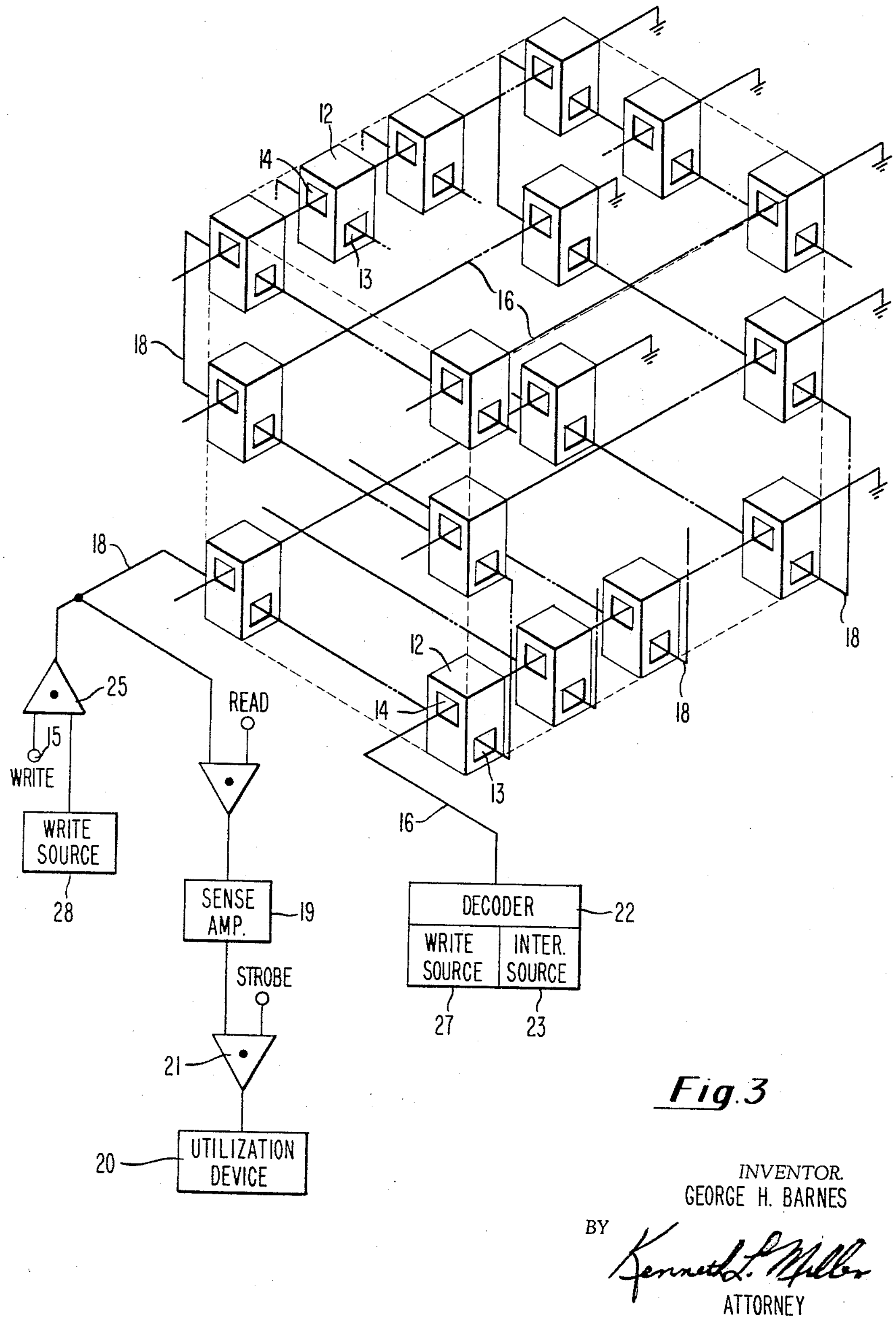
FIG. 3 illustrates one form of the present invention.

FIG. 3 may now be readily followed since in all respects, except the writing operation, it is the same as the FIG. 1 illustration. Like reference numerals have been used to simplify the understanding. Decoder 26 has been eliminated since drive wires 16 may serve as interrogate lines as well as word write lines, although it is appreciated that separate lines may both thread the word interrogate apertures if desired. The word write lines 24 have been eliminated as being unnecessary, thus simplifying the threading scheme and cutting down on objectional noise pulses.

The write operation of the embodiment of FIG. 3 is explained in connection with the waveforms of FIG. 4. To write new information into a selected word, a bidirectional pulse doublet 80, 81 is delivered to word drive line 16. It is not necessary that pulses 80 and 81 be capable of switching the remanent storage state of the material surrounding apertures 14. However, it is preferable for the remanent state to actually switch, especially for the first or "erasing" pulse 80, for writing to be completed with a single doublet. Concurrently with pulse 81, the write sources 28 provide current pulses 82 or 83 to the respective lines 18 to store the desired "ones" or "zeros." Although pulses 82 and 83 are illustrated as being coextensive with pulse 81, such pulses may start sooner, without harm, even during the presence of pulse 80, is desired. Pulses 82 and 83 must be below the switching threshold so as to provide a rewrite only to the selected word cores. The exact explanation of why the pulse doublet enables a pulse 82 or 83 below the switching threshold to switch the remanent state surrounding the storage aperture is not fully understood, but it is believed to be due to a component of rotational switching in the common volume of material between the apertures aiding the field surrounding the storage aperture 13. It is also believed that the remanent states sufficient for a read-out as taught in the prior art need not correspond to the two remanent states reached by fully switching the material about aperture 13, and that these later states are not reached by the use of the present invention, even though the output signals on read are just as large as those produced by application of the prior art.

If speed of writing is not essential in a particular application, a number of bidirectional doublets 80A, 81A may be applied concurrently with "one" or "zero" currents 82A, 83A applied to lines 18. It is expressly understood, however, that I have discovered that only a single such doublet is required. The effect of a number of such doublets is to generate a slightly larger amplitude signal upon subsequent interrogate and permit greater latitude in the amplitude of pulses 80A, 81A, 82A, and 83A. However, it is then more difficult to control the circuitry to have the last pulse be of a specific polarity It is preferred that the second pulse 81 of the doublet or the last of a number of such doublets have the same polarity and at least as large an amplitude as the unidirectional interrogate pulses 84. In this manner, there is no possibility of switching the remanent state of the material surrounding the interrogate aperture 14 during a read operation, thereby avoiding a peculiar waveform on first read, which happens if aperture 14 switches, avoiding reduced signal output after such a switch, or the reduced signal which results if read current is kept below threshold. The read current pulses 84 as well as the induced voltage signals 85 and 86 correspond to pulses 33, 34 and 35 of FIG. 2. It is understood, however, that the read current may be bidirectional and of any amplitude, if desired, without departing from the present teaching.

FIG. 5 depicts a second embodiment of the present invention. The second embodiment may be termed a magnetic memory "button" or "four holer" 88 with sense winding 89 and interrogate winding 90 orthogonally arranged through the oppositely disposed apertures. The core material preferably, though not necessarily, has a rectangular hysteresis characteristic. Legs intermediate the apertures have been numbered 1, 2, 3 and 4, with arrows indicating typical magnetic flux directions for one stable state of the device. To write into the button, both of the windings are utilized with a ready understanding being had by reference to the waveforms of FIG. 4.

As seen in FIG. 4A, a write drive may be applied to winding 90 and consists of a pulse doublet of opposite polarity. Each of the pulses 80 and 81 are able to switch the flux in the legs 1, 2, 3 and 4, although as in FIG. 3 this is not essential. The arrowheads of FIG. 5 arbitrarily designate the condition of the flux in the button after the termination of pulse 81. When pulse 80 is applied, the arrowheads of flux direction in each of the legs is reversed. In the writing scheme of the present invention, an orthogonal write approach is utilized whereby an informational signal is applied to sense winding 89 coincident with the drive at winding 90.

FIG. 4B illustrates an informational signal 83 which may cause a binary "one" to be stored or a signal 82 shown in phantom which may cause a binary "zero" to be stored. Pulses 82 and 83 are selected so as to be below the switching threshold of the button legs. However, it is understood that the magnetic field created by the information pulse coacts to control the resultant flux condition in the respective legs.

If it is assumed that a pulse 83 applied to winding 89 causes an upward flux in the button legs concurrently with the illustrated flux direction due to current drive pulse 81, it may be seen that there is a component of flux addition in legs 1 and 3, whereas the flux directions are opposed in legs 2 and 4. The result is a more complete flux switching in legs 1 and 3 as illustrated by the double headed arrows. A further effect is that legs 2 and 4 due to their less complete switching are left in a state of higher magnetic permeability. It is understood that the presence of pulse 82 instead of 83 results in legs 2 and 4 being more completely switched and correspondingly having a lower magnetic permeability. It is also understood that a greater amount of flux may be switched with a resulting larger output during interrogation if a number of bidirectional doublets 80A, 81A are applied to drive winding 90 coincident with an extended information pulse 82A or 83A. Greater latitude in the amplitude of pulses 80A, 81A, 82A, and 83A is also achieved. However, this slows down the operation and is not required for normal operation. Although pulse 83 has been illustrated as being coextensive with pulse 81, it may also extend during the presence of pulse 80 is desired.

During an interrogate operation, read pulse 84, below the switching threshold and preferably of the same polarity as the last pulse of the drive doublet, is applied to winding 90. An output voltage 85 is induced in winding 89 having a positive polarity followed by a negative polarity when the button stores a "one" and the reverse sequence waveform 86 when a "zero" is stored. The appropriate output appears to be due to the difference in permeability of the legs during the interrogation. The read-out is nondestructive and may be generated at rapid interrogation rates without undue heating of the button device.

FIG. 6 illustrates the inclusion of the button device in a word organized environment where block 92 includes a write source for generating the bidirectional doublet 80, 81 of FIG. 4 as well as the read pulse 84 to word drive line 90. Blocks 91–1 through **91–*n* provide the information current drive pulses 82 or 83 along sense lines 89–1 through 89–*n*** during a write operation and for sensing the output waveforms along those lines during an interrogate operation. Although FIG. 6 only illustrates a single word, it is understood that a complete array is contemplated in the same fashion as shown in FIG. 3 merely by substituting the storage devices.

Furthermore, as with the orthogonally apertured device, although a single drive line is illustrated serving as a write and interrogate line, it is to be recognized that separate lines for each function may be used if desired. It is also contemplated that further windings may be threaded through these devices to adapt them to the conventional coincident current type of writing if desired. This present invention is, however, directed to the organization utilized with what may be termed an "orthogonal write" operation using orthogonally arranged windings. and including at least a single bidirectional doublet on the drive line and an informational signal on the sense line. Reading may be performed by using those same lines.

The orthogonal write technique of the present invention has been described in connection with two multiapertured magnetic devices having nonintersecting apertures, but it is understood that the invention is limited only by the appended claims. Other changes, modifications and substitutions will occur to those skilled in the art without departing from the spirit of the invention.

What is claimed is:

1. In a magnetic core element having a plurality of apertures, the method of storing binary information in said element comprising the steps of: driving a first wire threaded through one of said apertures from a source with at least a single bidirectional current pulse doublet, applying concurrently with at least the second pulse of said pulse doublet an informational current pulse of a selected polarity to a second wire threaded through another of said apertures, said informational current pulse having a magnitude which is insufficient, in the absence of said concurrently applied second pulse of said pulse doublet, to alter the storage state to that representative of the opposite binary storage state.

2. In a magnetic core element having a plurality of non-intersecting apertures, the method of storing binary information in said element comprising the steps of: driving a first wire threaded through one of said apertures with a single bidirectional current pulse doublet, applying concurrently with at least the second pulse of said pulse doublet an informational current pulse of a selected polarity to a second wire threaded through another of said apertures, said second wire being in orthogonal relationship with said first wire, and said informational current pulse having a magnitude which is insufficient, in the absence of said concurrently applied second pulse of said pulse doublet, to alter the storage state of said element to that representative of the opposite binary state.

3. In a method of storing binary information in a magnetic core element as defined in claim 2, the further step of repeating said bidirectional pulse doublet for a number of cycles during which time said informational current pulse is established for at least a portion of said number of cycles and is present at least during the last pulse of the series of pulse doublets.

4. In a method of storing binary information as defined in claim 3, the added step of interrogating the stored state by providing a unidirectional interrogating current pulse to said first wire through said one of said apertures, the direction of said interrogating pulse being the same polarity as the last pulse of said number of bidirectional current pulse doublets in order to nondestructively enable a read out of the stored binary information state.

5. A magnetic core storage element of material capable of being placed in a plurality of remanent storage states, said core element having a plurality of nonintersecting apertures with a common flux zone intermediate said apertures, said element comprising a pair of orthogonally arranged conductors each threaded through at least a single one of said apertures, means for applying a single bidirectional current pulse doublet to a first of said conductors tending to switch flux in respective opposite directions in said common flux zone, means for applying concurrently with said bidirectional doublet an informational current pulse of a selected polarity to a second of said conductors, said informational current pulse having a magnitude which is insufficient by itself to exceed a switching threshold, but which is capable when applied concurrently with the second pulse of said pulse doublet to switch the magnetic material in said common flux zone intermediate said apertures to a flux condition capable of being subsequently interrogated nondestructively to determine the state selected by said information current pulse.

6. A magnetic core element as defined in claim 5 having a further interrogating means associated with at least a single one of said apertures, the magnitude of current provided by said interrogating means being insufficient to completely switch the remanent magnetic state of the material in said common flux zone in order to provide a nondestructive read out of the stored informational state of said element, and sensing means associated with at least a single one of the remaining of said apertures for detecting the stored information state of said element.

7. The device as recited in claim 6 wherein said magnetic element is a block of magnetic material having two orthogonally arranged nonintersecting apertures passing therethrough termed a storage aperture and a drive aperture, and wherein said drive aperture has a single conductor threaded therethrough serving both as a write pulse doublet conductor and as an interrogate conductor and wherein said storage aperture has a single conductor threaded therethrough serving as a write informational conductor and as a sense conductor.

8. A device as recited in claim 6 wherein said element is comprised of a button of magnetic material having four apertures extending through the face of said button, said four apertures being arranged in vertical and horizontal pairs with a first conductor linking through said vertical apertures and a second conductor orthogonally arranged and linking through said horizontally arranged apertures, the dimensions of said button being such that the flux surrounding said apertures is limited by the thinnest volume of material appearing in the common legs intermediate the respective apertures, the arrangement being such that a write pulse doublet applied to the conductor threading one pair of apertures is sufficient in amplitude when combined with an informational current pulse applied to the other of said conductors, to cause a pair of said legs to be more nearly saturated than the alternate pair of said legs, thus providing a difference in magnetic coupling between said conductors upon interrogation enabling a nondestructively sensed output indicative of the stored informational state.

9. A magnetic storage device comprising a magnetic element of material capable of being placed in a plurality of remanent storage states, said element having a plurality of non-intersecting apertures threaded by a pair of orthogonally arranged conductors termed a drive and information conductor, means applying an information current to said information conductor of a selected polarity representative of a binary bit to be stored in the element and of insufficient amplitude to switch the flux state of the common flux zone intermediate said apertures, means applying concurrently a single bidirectional current pulse doublet to said drive conductor, said doublet having sufficient amplitude to switch the remanent state of the flux of said common flux zone, the flux condition thereby stored being indicative of the polarity of the information current and capable of being nondestructively interrogated by the application of unidirectional current pulses applied to said drive conductor.

10. A magnetic storage device as defined in claim 9 wherein said element is comprised of a block of magnetic material having two orthogonally oriented nonintersecting apertures.

11. A magnetic storage device as defined in claim 9 wherein said element is comprised of a button of magnetic material having a pair of vertically arranged apertures in the face of said button for receiving said drive conductor and a pair of horizontally arranged apertures in the face of said button for receiving said information conductor.

12. A magnetic storage device as defined in claim 9 wherein a nondestructive interrogate means is connected to said drive conductor applying unidirectional pulses of the same polarity as the second pulse of said writing pulse doublet.

13. A magnetic array of core elements comprising a plurality of cores having multiple nonintersecting apertures, a pair of conductors threaded through each of said core elements in an orthogonal relationship, the apertures in each core element being termed drive and store apertures, a plurality of said cores making up a first word and having a single conductor threaded through the drive apertures of each of said cores of said word, drive means associated with said conductor for selectively applying a single bidirectional current pulse doublet, separate means associated with the remaining conductor of each of said core elements of a selected word providing an informational current pulse of a selected polarity concurrently with at least the second pulse of the drive current pulse doublet, the amplitude of each informational current pulse by itself being insufficient to switch the storage state of the magnetic material surrounding the respective storage apertures and the arrangement being such that the appearance of the informational current pulse concurrently with the drive pulse doublet creates a flux change sufficient to store a desired remanent informational storage state in the common flux zone intermediate said apertures.

14. The magnetic arrangement as defined in claim 13 wherein said magnetic core elements comprise a block of magnetic material having a pair of orthogonally arranged and nonintersecting apertures where a single pulse of interrogating current may be applied to the drive line enabling a nondestructive read out of the respective core elements, the output signal from each element being an induced voltage bidirectional pulse doublet whose sequence of polarities is determined solely by the storage state of the material in said common flux zone intermediate said apertures.

15. A magnetic arrangement as defined in claim 13 wherein said storage elements are comprised of a flat button of magnetic material having a pair of vertically arranged and a pair of horizontally arranged apertures extending through the face thereof and wherein the drive conductor is threaded through the vertically arranged apertures and the storage conductor is threaded through the horizontally arranged conductors in an orthogonal relationship and whereby an interrogate current pulse may be provided to a single drive conductor serially connected through a series of said elements constituting a word to nondestructively read out the storage state of said respective core elements of the selected word to generate on the respective storage conductors an induced bidirectional voltage pulse doublet, the polarity sequence of which is indicative of the stored state of flux in the material intermediate the respective apertures.

16. In an information register, the combination comprising a plurality of planes each having a plurality of magnetic elements, homologously located magnetic elements in each of said planes constituting bit positions of respective words of information, said magnetic elements having a plurality of nonintersecting apertures with a common flux zone intermediate said apertures, a plurality of drive lines each threaded through at least a single aperture of each magnetic element making up a respective word, a plurality of information lines each threaded through at least a further single aperture of the magnetic elements representing a common bit position located within the respective planes, means for writing information into a selected word including means providing a single bidirectional pulse doublet to a selected one of said drive lines concurrently with the application of information unidirectional current pulses of a selected polarity to selected storage lines, the magnitude of current applied to said storage lines being insufficient to cause the remanent storage state of the common flux zones of said elements to be switched.

17. In an information register as defined in claim 16, nondestructive interrogate means for said selected word comprising means providing a drive current pulse to a drive line of a selected word causing a nondestructive flux change in said common flux zone of said magnetic elements thereby inducing in said information lines voltages indicative of the stored binary bits of said selected word.

18. In an information register as defined in claim 16, the arrangement wherein said magnetic elements are blocks of magnetic material having two apertures orthogonally aranged.

19. In an information register as defined in claim 16, the arrangement wherein said magnetic elements are buttons having a pair of vertically arranged apertures for receiving said drive lines and a pair of horizontally arranged apertures for receiving said information lines, said apertures extending through the face of said button with the minimum volume of magnetic material being in the common flux zone intermediate the respective apertures.

References Cited

UNITED STATES PATENTS 3,189,879 6/1965 Mac Intyre et al. ---- 340—174

JAMES W. MOFFITT, *Primary Examiner.*